US008732285B2

(12) United States Patent
Lambert et al.

(10) Patent No.: US 8,732,285 B2
(45) Date of Patent: May 20, 2014

(54) UPGRADEABLE PERSISTENT VIRTUAL STORAGE

(75) Inventors: Timothy Lambert, Austin, TX (US); Alaa Yousif, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1096 days.

(21) Appl. No.: 11/334,613

(22) Filed: Jan. 18, 2006

(65) Prior Publication Data
US 2007/0168481 A1 Jul. 19, 2007

(51) Int. Cl.
G06F 12/08 (2006.01)
G06F 3/06 (2006.01)

(52) U.S. Cl.
CPC ...... *G06F 3/0664* (2013.01); *G06F 2003/0694* (2013.01)
USPC .................. 709/223; 713/1; 711/112; 707/10

(58) Field of Classification Search
USPC ................... 709/208–211; 710/110; 700/1–3; 613/208–211
See application file for complete search history.

(56) References Cited

U.S. PATENT DOCUMENTS

| 6,237,048 | B1 * | 5/2001 | Allen et al. ................. 710/8 |
| 6,636,929 | B1 | 10/2003 | Frantz et al. |
| 7,200,546 | B1 * | 4/2007 | Nourmohamadian et al. . 703/24 |
| 7,236,987 | B1 * | 6/2007 | Faulkner et al. .......... 707/104.1 |
| 2002/0194414 | A1 * | 12/2002 | Bateman et al. .............. 710/303 |
| 2003/0001856 | A1 * | 1/2003 | Sawada et al. ................ 345/581 |
| 2003/0110157 | A1 * | 6/2003 | Maki et al. ........................ 707/1 |
| 2004/0184174 | A1 * | 9/2004 | Woo ............................. 360/39 |
| 2004/0186837 | A1 * | 9/2004 | Lambert et al. ................ 707/10 |
| 2004/0221145 | A1 * | 11/2004 | Bolen et al. ..................... 713/1 |
| 2005/0144353 | A1 | 6/2005 | Long et al. |
| 2005/0182615 | A1 * | 8/2005 | Kern ................................ 703/24 |
| 2006/0206666 | A1 * | 9/2006 | Lambert et al. ............... 711/115 |
| 2007/0016827 | A1 * | 1/2007 | Lopez et al. .................... 714/31 |

FOREIGN PATENT DOCUMENTS

JP 2000181932 A * 6/2000
JP 2005165486 A * 6/2005

OTHER PUBLICATIONS

Aspinwall, "PC Hacks," O'Reilly Media, Inc., Oct. 25, 2004.*
Jon McGary and Donnie Bell, DRAC 4 Dell Remote Access Controller, Oct. 2004, pp. 18-20.*
Weimin Pan and Gang Liu, Virtual Media in the DRAC 4, Oct. 2004, pp. 30-34.*
"HP Remote Insight Lights-Out Edition II User Guide", Feb. 2006, Pages: All.*

* cited by examiner

*Primary Examiner* — Andrew Goldberg
(74) *Attorney, Agent, or Firm* — Baker Botts L.L.P.

(57) ABSTRACT

A method to provide at least one of a scalable, a replaceable, and an upgradeable device via remote access solution virtual media includes emulating a physical plug-and-play universal serial bus device to a managed host server system as a virtual media device using firmware in a service processor and a virtual media engine of a remote access solution comprising a remote access card disposed in the managed host server system, the physical plug-and-play universal serial bus device disposed in the remote access card, proxying data communications between the physical plug-and-play universal serial bus device and the managed host server system through the service processor, and allowing remote access to the physical plug-and-play universal serial bus device by a remote management client using the firmware in the service processor and the virtual media engine via an out-of-band dedicated remote access card network interface card disposed in the remote access card.

20 Claims, 7 Drawing Sheets

UPGRADEABLE PERSISTENT VIRTUAL STORAGE

TECHNICAL FIELD OF THE INVENTION

This invention relates generally to information handling systems and, more particularly, to a method and system for providing a scalable, replaceable, and/or upgradeable device via remote access solution virtual media.

BACKGROUND OF THE INVENTION

As the value and use of information continues to increase, individuals and businesses continually seek additional ways to process and store information. One option available to users of information is an information handling system. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems, such as computers, including servers and workstations, are often grouped in clusters to perform specific tasks. A server cluster is a group of independent servers that is managed as a single system and is characterized by higher availability, manageability, and scalability, as compared with groupings of unmanaged servers. A server cluster typically involves the configuration of a group of independent servers such that the servers appear in the network as a single machine or unit. Server clusters are often managed as a single system, share a common namespace on the network, and are designed specifically to tolerate component failures and to support the addition or subtraction of components in the cluster in a transparent manner. At a minimum, a server cluster includes two or more servers that are connected to one another by a network. The server cluster may include software driven methods by which each client of the server cluster may access the data stored in or controlled by a server of the server cluster. One software application that is used to manage the operation of a server cluster is Microsoft Cluster Service (MSCS), which is produced by the Microsoft Corporation of Redmond, Wash.

When using a file system such as the JFFS2 file system for applications like universal serial bus (USB) keys, the file system typically contains a wear-leveling feature to reduce the number of write cycles to a given cell and increase the life of a flash read only memory (ROM). With moderate USB key usage, the USB key can wear out in as little as 12-18 months. Remote access solutions, like a remote access card, may contain a feature such as persistent virtual memory, which is where firmware for the remote access card (RAC) creates a partition in the flash ROM of the remote access card (RAC) that the remote access card (RAC) emulates through a plug-and-play virtual media interface to the host or managed server as a USB key. These partitioned sectors in the flash ROM of the remote access card (RAC) may also be remotely accessible so that remote administrators may use this persistent virtual memory as a medium for exchange of data to the host or managed server, and the host or managed server may access or boot from these partitioned sectors even without a remote connection, since the virtual memory is persistent.

However, one problem is that even with wear-leveling, moderate to heavy usage of this persistent virtual memory feature will wear out the flash ROM of the remote access card (RAC) before the useful life of the remote access card (RAC) and/or resident server. In addition, a virus and/or a runaway process may quickly wear out the flash ROM of the remote access card (RAC) via excessive writes. For example, an accidental debug code left in production firmware may wear out the flash ROM of the remote access card (RAC) in the field after only about 7 months.

Another problem is that users and/or customers may have very different usages for this feature that may require a very large amount of memory, such as an entire operating system (OS), a full boot image, system diagnostics, backup firmware, basic input/output system (BIOS) images, and the like. Conventional remote access card (RAC)s may only afford about 8 megabytes (MB) of storage in the main flash ROM of the remote access card (RAC). However, 8 MB may not be enough for the wide variety of applications. Moreover, the useful life of a conventional remote access card (RAC) may be 8 years or so, and there are no conventional solutions that allow the persistent virtual storage to be scaled without burdening the base system cost and that do not result in prematurely failing remote access cards (RACs) when the flash ROMs of the remote access cards (RACs) wear out.

SUMMARY OF THE INVENTION

According to various illustrative embodiments of the present invention, a method to provide at least one of a scalable, a replaceable, and an upgradeable device via remote access solution virtual media includes emulating a physical plug-and-play universal serial bus device to a managed host server system as a virtual media device using firmware in a service processor and a virtual media engine of a remote access solution comprising a remote access card disposed in the managed host server system, the physical plug-and-play universal serial bus device disposed in the remote access card. The method also includes proxying data communications between the physical plug-and-play universal serial bus device and the managed host server system through the service processor. The method also includes allowing remote access to the physical plug-and-play universal serial bus device by a remote management client using the firmware in the service processor and the virtual media engine via an out-of-band dedicated remote access card network interface card disposed in the remote access card.

In various aspects, a method to provide at least one of a scalable, a replaceable, and an upgradeable mass storage device via remote access solution virtual media, according to various illustrative embodiments of the present invention, includes emulating a physical plug-and-play universal serial bus mass storage device to a managed host server system as a persistent virtual mass storage device using firmware in a service processor and a virtual media engine of a remote access solution comprising a remote access card disposed in the managed host server system, the physical plug-and-play universal serial bus mass storage device disposed in the remote access card. The method also includes proxying data communications between the physical plug-and-play universal serial bus mass storage device and the managed host server system through the service processor. The method also includes allowing remote access to the physical plug-and-play universal serial bus mass storage device by a remote management client using the firmware in the service processor and the virtual media engine via an out-of-band dedicated remote access card network interface card disposed in the remote access card.

In various other aspects, a system for providing at least one of a scalable, a replaceable, and an upgradeable device via remote access solution virtual media, according to various illustrative embodiments of the present invention, includes a managed host server system and a remote access solution comprising a remote access card disposed in the managed host server system, the remote access card comprising a service processor and a virtual media engine. The system also includes a physical plug-and-play universal serial bus device disposed in the remote access card, wherein the service processor and the virtual media engine have firmware capable of emulating the physical plug-and-play universal serial bus device to the managed host server system as a virtual media device, proxying data communications between the physical plug-and-play universal serial bus device and the managed host server system through the service processor, and allowing remote access to the physical plug-and-play universal serial bus device by a remote management client via at least one remote access card administrative command through an out-of-band dedicated remote access card network interface card disposed in the remote access card.

The method and system disclosed herein are advantageous in providing a scalable, replaceable, and/or upgradeable device via remote access solution virtual media without substantially burdening the base system cost. In various illustrative embodiments, the method and system disclosed herein are advantageous in providing a scalable, replaceable, and/or upgradeable persistent virtual mass storage device via remote access solution virtual media without substantially burdening the base system cost. Users and/or customers may choose the size or scale of this persistent virtual mass storage device and/or replace this persistent virtual mass storage device if this persistent virtual mass storage device ever wears out and/or upgrade this persistent virtual mass storage device without needing to replace the entire remote access solution. Other technical advantages will be apparent to those of ordinary skill in the art having the benefit of the present disclosure and in view of the following specification, claims, and drawings.

BRIEF DESCRIPTION OF THE DRAWINGS

The following figures form part of the present specification and are included to further demonstrate certain aspects of the present invention, and should not be used to limit or define the present invention. The present invention may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein.

It is to be noted, however, that the appended drawings illustrate only typical embodiments of the present invention and are, therefore, not to be considered limiting of the scope of the present invention, as the present invention may admit to other equally effective embodiments.

DETAILED DESCRIPTION OF EXEMPLARY EMBODIMENTS OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
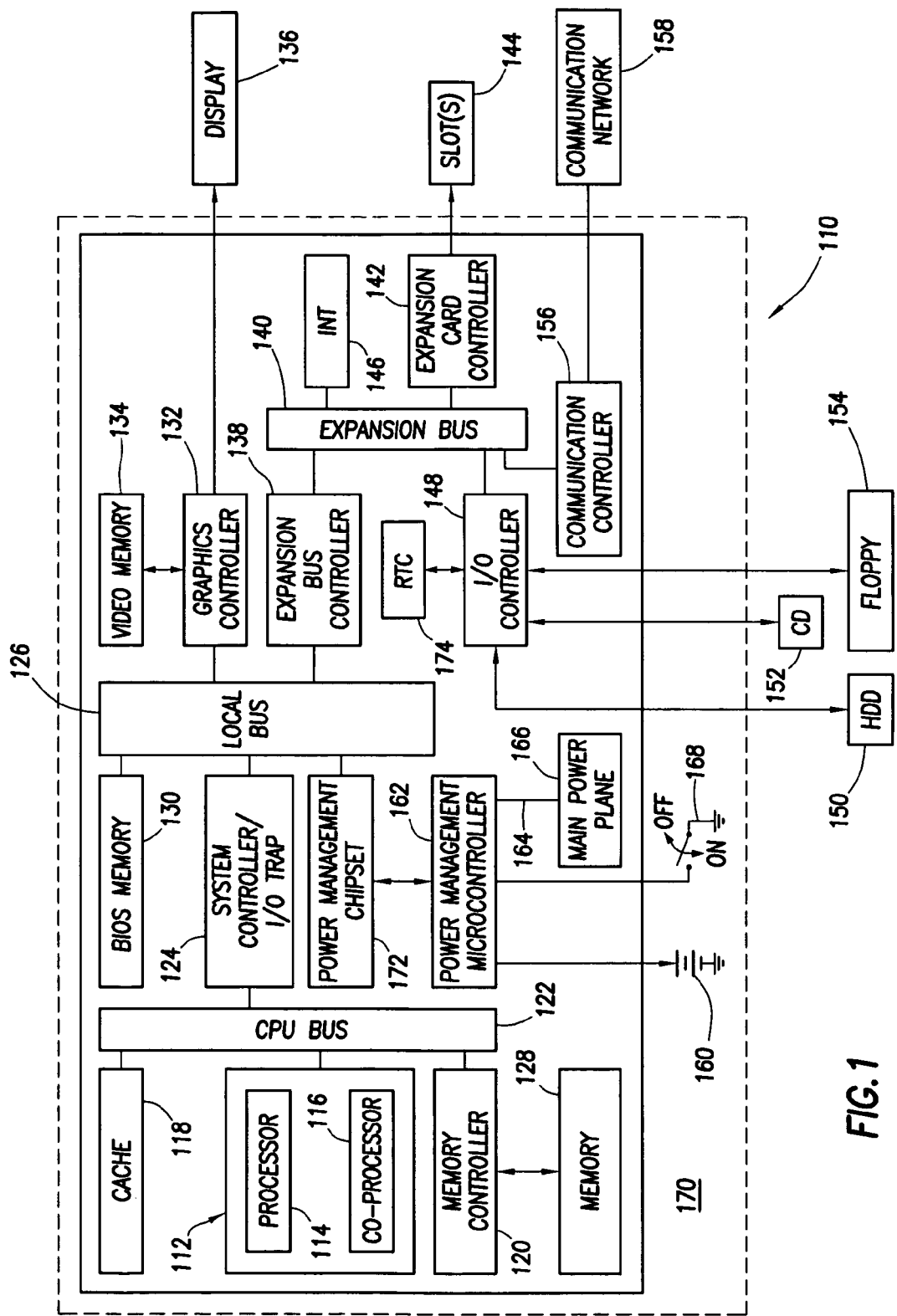
FIG. 1 schematically illustrates a block diagram showing an information handling system, according to teachings of the present disclosure.

Referring first to FIG. 1, a block diagram of an information handling system 110 is shown, according to teachings of the present disclosure. The information handling system 110 or the computer system 110 preferably may include at least one microprocessor or central processing unit (CPU) 112. The CPU 112 may include a processor 114 for handling integer operations and a co-processor 116 for handling floating point operations. The CPU 112 may preferably be coupled to a cache 118 and a memory controller 120 via a CPU bus 122. A system controller input/output (I/O) trap 124 preferably may couple the CPU bus 122 to a local bus 126 and may be generally characterized as part of a system controller.

A main memory 128 of dynamic random access memory (DRAM) modules may preferably be coupled to the CPU bus 122 by the memory controller 120. The main memory 128 may be divided into one or more areas such as a system management mode (SMM) memory area (not expressly shown).

A basic input/output system (BIOS) memory 130 may also preferably be coupled to the local bus 126. A FLASH memory or other nonvolatile memory may be used as the BIOS memory 130. A BIOS program (not expressly shown) may typically be stored in the BIOS memory 130. The BIOS program preferably may include software that facilitates interaction with and between the information handling system 110 devices such as a keyboard (not expressly shown), a mouse (not expressly shown), and/or one or more I/O devices. The BIOS memory 130 may also store system code (note expressly shown) operable to control a plurality of basic information handling system 110 operations.

A graphics controller 132 may preferably be coupled to the local bus 126 and to a video memory 134. The video memory 134 may preferably be operable to store information to be displayed on one or more display panels 136. The display panel 136 may be an active matrix or passive matrix liquid crystal display (LCD), a cathode ray tube (CRT) display, and/or another display technology. In selected applications, uses and/or instances, the graphics controller 132 may also be coupled to an integrated display, such as in a portable information handling system implementation.

A bus interface controller or expansion bus controller 138 may preferably couple the local bus 126 to an expansion bus 140. In various illustrative embodiments, the expansion bus 140 may be configured as an industry standard architecture (ISA) bus. Other buses, for example, a peripheral component interconnect (PCI) bus, may also be used.

In certain information handling system 110 embodiments, an expansion card controller 142 may also be included and may preferably be coupled to the expansion bus 140 as shown in FIG. 1. The expansion card controller 142 may preferably be coupled to a plurality of information handling system 110 expansion slots 144. The expansion slots 144 may be configured to receive one or more computer components (not expressly shown) such as an expansion card (e.g., modems, fax cards, communications cards, and/or other I/O devices).

An interrupt request generator 146 may also preferably be coupled to the expansion bus 140. The interrupt request generator 146 may preferably be operable to issue an interrupt service request over a predetermined interrupt request line in response to receipt of a request to issue an interrupt instruction from the CPU 112.

An I/O controller 148, often referred to as a super I/O controller 148, may also preferably be coupled to the expansion bus 140. The I/O controller 148 may preferably interface to an integrated drive electronics (IDE) hard drive device (HDD) 150, a compact disk-read only memory (CD-ROM) drive 152, and/or a floppy disk drive (FDD) 154. Other disk drive devices (not expressly shown) that may be interfaced to the I/O controller 148 include a removable hard drive, a zip drive, a CD-RW (compact disk-read/write) drive, and a CD-DVD (compact disk-digital versatile disk) drive.

A communication controller 156 may preferably be provided and may enable the information handling system 110 to communicate with a communication network 158, for example, an Ethernet network. The communication network 158 may include a local area network (LAN), a wide area network (WAN), the Internet, an Intranet, wireless broadband, and the like. The communication controller 156 may be employed to form a network interface for communicating with other information handling systems (not expressly shown) coupled to the communication network 158.

As shown in FIG. 1, the information handling system 110 may preferably include a power supply 160, which may provide power to the many components and/or devices that form the information handling system 110. The power supply 160 may be a rechargeable battery, such as a nickel metal hydride (NiMH) or a lithium ion battery, when the information handling system 110 is embodied as a portable or notebook computer, an A/C (alternating current) power source, an uninterruptible power supply (UPS) or other power source.

The power supply 160 may preferably be coupled to a power management microcontroller 162. The power management microcontroller 162 may preferably control the distribution of power from the power supply 160. More specifically, the power management microcontroller 162 may preferably include a power output 164 coupled to a main power plane 166 that may supply power to the CPU 112 as well as to other information handling system 110 components. The power management microcontroller 162 may also be coupled to a power plane (not expressly shown) operable to supply power to an integrated panel display (not expressly shown), as well as to additional power delivery planes that preferably may be included in the information handling system 110.

The power management microcontroller 162 may preferably monitor a charge level of an attached battery and/or a UPS to determine when and when not to charge the battery or the UPS. The power management microcontroller 162 may preferably also be coupled to a main power switch 168, which the user may actuate to turn the information handling system 110 on and off. While the power management microcontroller 162 may power down one or more portions or components of the information handling system 110, for example, the CPU 112, the display 136, and/or the HDD 150, and the like, when not in use to conserve power, the power management microcontroller 162 itself may preferably be substantially always coupled to a source of power, preferably the power supply 160.

A computer system, a type of information handling system 110, may also include a power management chip set 172. The power management chip set 172 may preferably be coupled to the CPU 112 via the local bus 126 so that the power management chip set 172 may receive power management and control commands from the CPU 112. The power management chip set 172 may preferably be connected to a plurality of individual power planes operable to supply power to respective components of the information handling system 110, for example, the HDD 150, the FDD 154, and the like. In this manner, the power management chip set 172 may preferably act under the direction of the CPU 112 to control the power supplied to the various power planes and components of a system.

A real-time clock (RTC) 174 may also be coupled to the I/O controller 148 and the power management chip set 172. Inclusion of the real-time clock (RTC) 174 may permit timed events and/or alarms to be transmitted to the power management chip set 172. The real-time clock (RTC) 174 may be programmed to generate an alarm signal at a predetermined time as well as to perform other operations.

The information handling system 110 may be associated with a chassis 170. Generally, the chassis 170 may be referred to as the computer case and/or case that encloses some of the components within the information handling system 110. However, other components such as the CD drive 152, the floppy drive 154 and/or the HDD 150, may be placed internal to the chassis 170 and/or separately from the chassis 170 in a stand-alone enclosure (described below in more detail) and/or connected in series.

Figure 2:
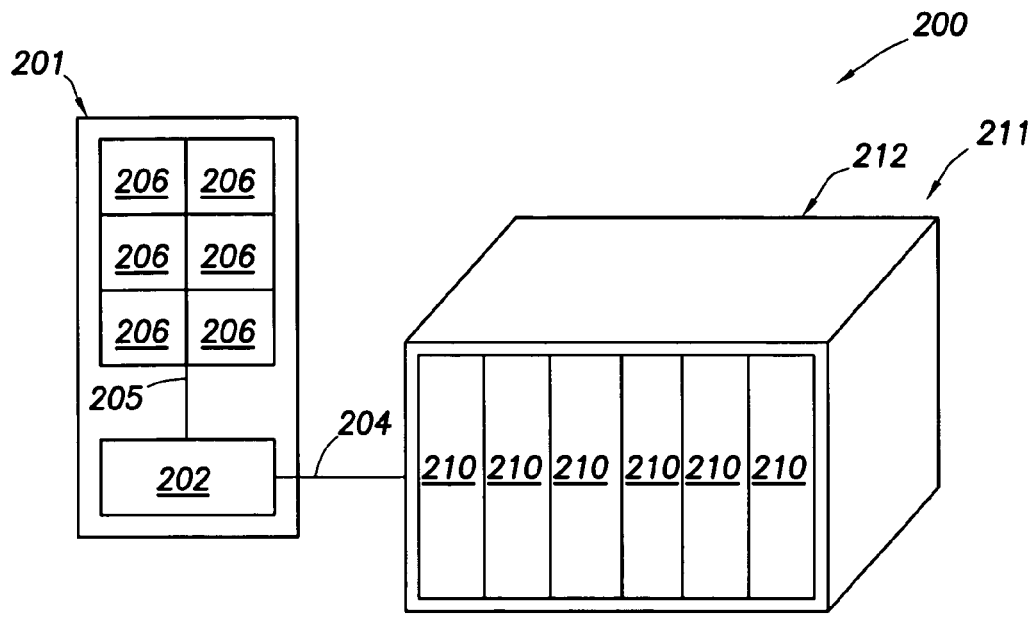
FIG. 2 schematically illustrates a block diagram showing an exemplary embodiment of a storage system including a controller mounted on an internal backplane having hard disk drives (HDD) and a stand-alone enclosure coupled to the controller having additional HDD connected via a SCSI bus, according to teachings of the present disclosure.
Figure 3:
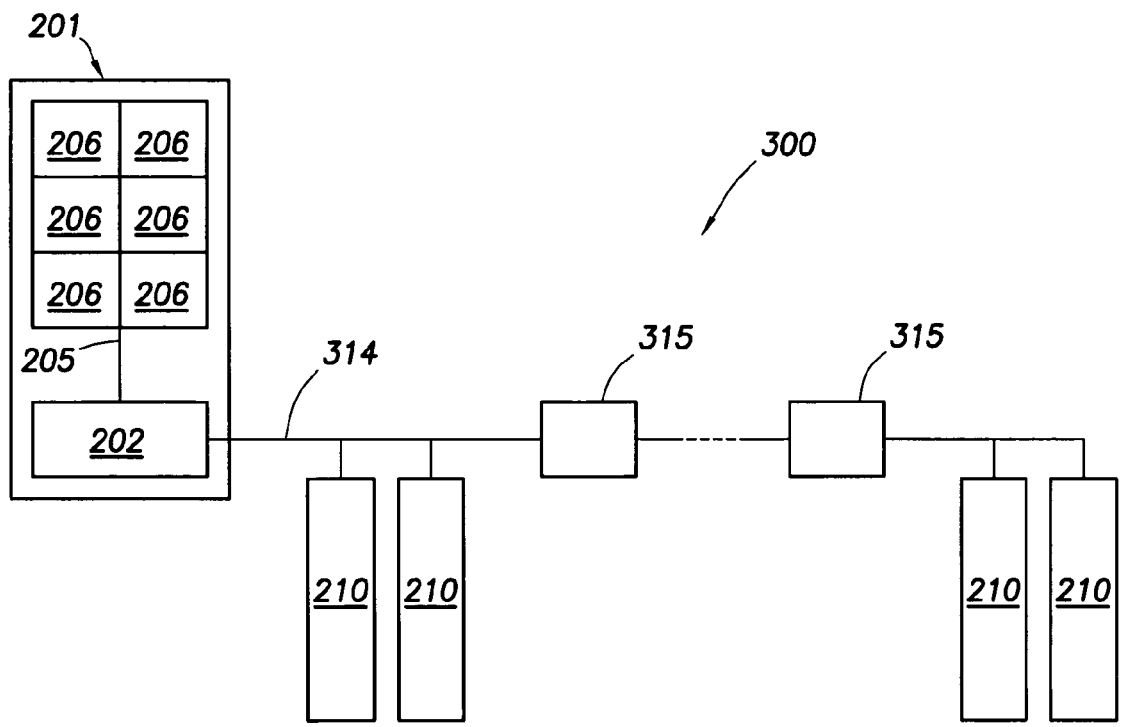
FIG. 3 schematically illustrates a block diagram showing an exemplary embodiment of a storage system including a controller mounted on an internal backplane having hardware devices such as HDD connected via a point-to-point link, according to teachings of the present disclosure.

As shown in FIGS. 2 and 3, for example, one or more computer components may be communicatively connected to the information handling system 110 via a bus 204, as described below in more detail, or through a point-to-point link 314. In some embodiments, the information handling system 110 may include a storage system 200 (described below in more detail) that uses a small computer system interface (SCSI), Fibre Channel, serial attached SCSI (SAS), and/or other standard for communications between components and/or devices and the system. One example of a point-to-point link in an SAS storage subsystem may include a group of links also known as a "fabric" that uses a Fibre Channel standard for interfacing between controllers and drives.

FIGS. 2 and 3 are block diagrams showing various exemplary embodiments of the storage system 200, including a small computer system interface (SCSI) storage subsystem 211 and a serial attached SCSI (SAS) storage subsystem 300, respectively. Each storage subsystem 200 may include a controller 202 mounted on an internal backplane 201 having hard disk drives (HDDs) 206. The SCSI storage subsystem 211 may further include a stand-alone enclosure 212 that may include input/output (I/O) expanders coupled to a controller 202 having additional SCSI devices such as the HDDs 210 connected via a SCSI bus 204. The SAS storage subsystem 300 may further include additional SCSI devices such as the HDDs 210 interconnected via the point-to-point link 314. In various illustrative embodiments, the SAS storage subsystem 300 may further include one or more expanders 315 that may be operable to regenerate, reshape, and/or retransmit a SCSI signal to additional SCSI devices such as the HDDs 210 interconnected via the point-to-point link 314.

A SCSI/SAS storage system such as storage system 200 may include a plurality of hardware and/or SCSI devices such as the internal hard disk drives (HDDs) 206 and the external hard disk drives (HDDs) 210 that are connected via I/O expanders. Other examples of SCSI devices may include tape drives (not expressly shown) and/or compact disk drives (not expressly shown).

The I/O expanders may allow the SCSI devices to connect to the storage system 200. The I/O expanders may include the SCSI expanders 315 that may include expander chips (not expressly shown), the internal backplane 201 and/or the enclosure 212 that may have connections for the SCSI devices to communicate with the storage system 200 via a SCSI bus such as the internal bus 205 and the external bus 204. Useful exemplary enclosures 212 may include a PowerVault 220 system and/or a PowerVault 210 system manufactured by Dell, Inc. Because the SCSI devices may reside at different locations and/or configurations within the storage system 200, the controller 202 may be used to direct communications to the address associated with each SCSI device.

The SAS storage subsystem 300 may further include one or more SCSI expanders 315 that may be used to link and/or interconnect with one or more hardware devices such as the HDD 210. However, there may not necessarily be one SCSI expander for each hardware device such as the hard disk drive (HDD) 210.

Each hardware and/or SCSI device within the storage system 200 may be represented as a SCSI target. Each SCSI device may include an address for communications between a processor and memory (not expressly shown) in the storage system 200 via an I/O controller such as the controller 202 shown on the internal backplane 201. The controller 202 may direct information between the SCSI devices via the internal bus 205 and/or the external bus 204.

The connections on SCSI devices may be interchangeable such that an internal SCSI device such as the internal HDD 206 may be placed in the enclosure 212, having an I/O expander. Similarly, the external HDD 210 may connect to the internal backplane 201 in lieu of the internal HDD 206.

Even though the SCSI devices may physically connect at the different locations, compatibility issues may arise such as the SCSI device may not be supported. Thus, the controller 202 may perform a scan for devices placed on interconnections such as the bus 204 and the point-to-point link 314 for devices associated with storage system 200 to identify potential compatibility issues. For example, compatibility issues may arise between a combination of the SCSI controller and an SCSI hardware device, the SCSI controller and an attached enclosure, the enclosure and an SCSI device, and the SCSI device and another SCSI device. Furthermore, firmware compatibility issues may arise such as one or more of the devices may not have the most up-to-date revision of the appropriate respective firmware.

Figure 4:
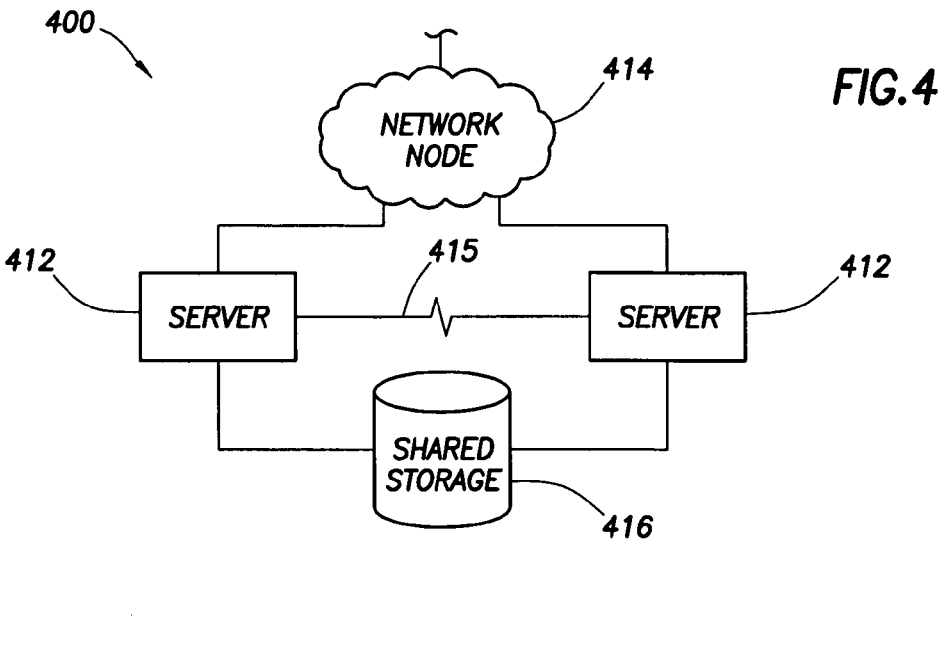
FIG. 4 schematically illustrates a block diagram of a server cluster network.

Shown in FIG. 4 is an exemplary embodiment of a two-node server cluster network 400. The server cluster network 400 may include one or more server nodes 412 that may be interconnected to one another by a heartbeat or communications link 415. Each of the server nodes 412 may be coupled to a network node 414, which represents a connection to a communications network served by the server nodes 412. Each of the server nodes 412 may be coupled to a shared storage unit 416.

Figure 5:
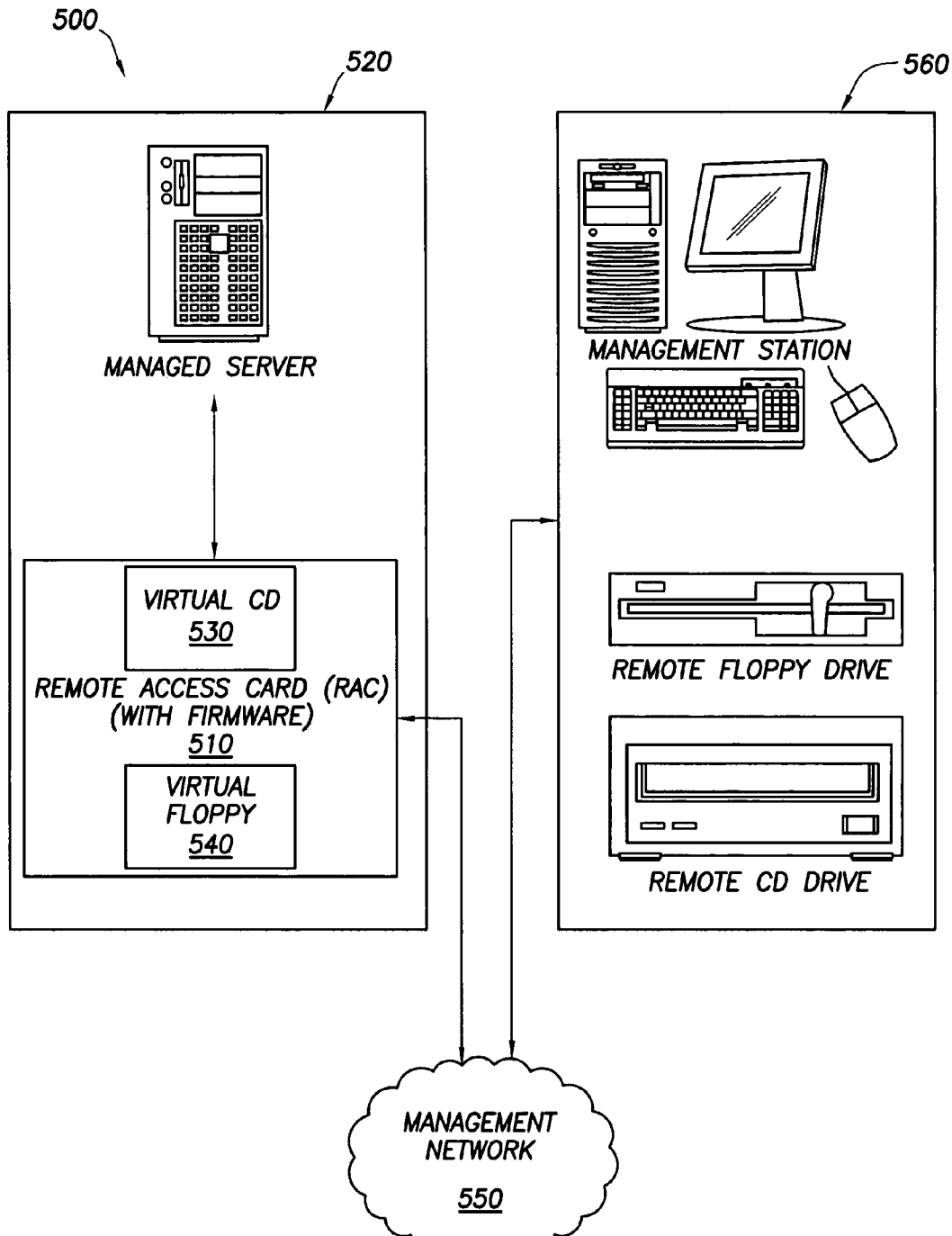
FIG. 5 schematically illustrates an example of the overall architecture and operation of the virtual media feature of a remote access card (RAC) useful in various exemplary embodiments, according to teachings of the present disclosure.

FIG. 5 schematically illustrates an example of the overall architecture 500 and operation of the virtual media feature of a remote access card (RAC) 510, such as the Dell® Remote Access Controller 5 (DRAC5) 510. To manage an information handling system, such as a server cluster, remotely, administrators often require a way to remotely copy files to and from the information handling system, such as the server cluster, install applications such as Dell OpenManage® systems management software, and/or install new operating systems, and the like. Such tasks may be performed readily using the virtual media feature in the Dell® Remote Access Controller 5 (DRAC5) 510.

The Dell® Remote Access Controller 5 (DRAC5) 510 is an independent, out-of-band management card. The Dell® Remote Access Controller 5 (DRAC5) 510 has its own microprocessor with an embedded operating system (OS), network interface card (NIC), Web server, Telnet interface, and serial interface. The out-of-band mode of communication may allow communication with the Dell® Remote Access Controller 5 (DRAC5) card 510 and/or a managed host server system 520, in which the Dell® Remote Access Controller 5 (DRAC5) card 510 is disposed and/or installed, through the Dell® Remote Access Controller 5 (DRAC5) 510 card's remote access ports, ethernet (a network interface card or NIC embedded in the DRAC4 card 510), and/or a VT100 serial interface. The Dell® Remote Access Controller 5 (DRAC5) 510 in the managed host server system 520 runs on auxiliary power and is available even when the managed host server system is powered down. Major features in the Dell® Remote Access Controller 5 (DRAC5) 510 include virtual media, console redirection, power management, alerts, system event logs, and the Microsoft® Active Directory® directory service.

The virtual media feature in the Dell® Remote Access Controller 5 (DRAC5) 510 provides the managed host server system 520 with a virtual CD drive 530 and/or a virtual floppy disk drive 540, for example, that may use standard media connected anywhere on a management network 550 in which the managed host server system 520 may be disposed. The virtual CD drive 530 and the virtual floppy disk drive 540 are two electronic devices embedded in the Dell® Remote Access Controller 5 (DRAC5) 510 and controlled by firmware of the Dell® Remote Access Controller 5 (DRAC5) 510. To the operating system (OS) and/or basic input/output system (BIOS) on the managed host server system 520, the virtual CD drive 530 and the virtual floppy disk drive 540 look like a physical CD drive 570 and a physical floppy disk drive 580.

As described above, FIG. 5 schematically illustrates an example of the overall architecture 500 and operation of the virtual media feature of the remote access card (RAC) 510, such as the Dell® Remote Access Controller 5 (DRAC5) 510. A management station 560 provides the physical media, such as the remote physical CD drive 570 and/or the remote physical floppy disk drive 580, and/or an image file across the management network 550. For the virtual media feature to work, a virtual media plug-in should be installed in the management station 560. When a remote administrator connects to the remote access card (RAC) 510, such as the Dell® Remote Access Controller 5 (DRAC5) 510, through a Web browser and opens the virtual media page for the first time, or when a new version of the plug-in is available in the firmware of the remote access card (RAC) 510, such as the Dell® Remote Access Controller 5 (DRAC5) 510, the virtual media plug-in may be downloaded and installed on the management station 560.

Figure 6:
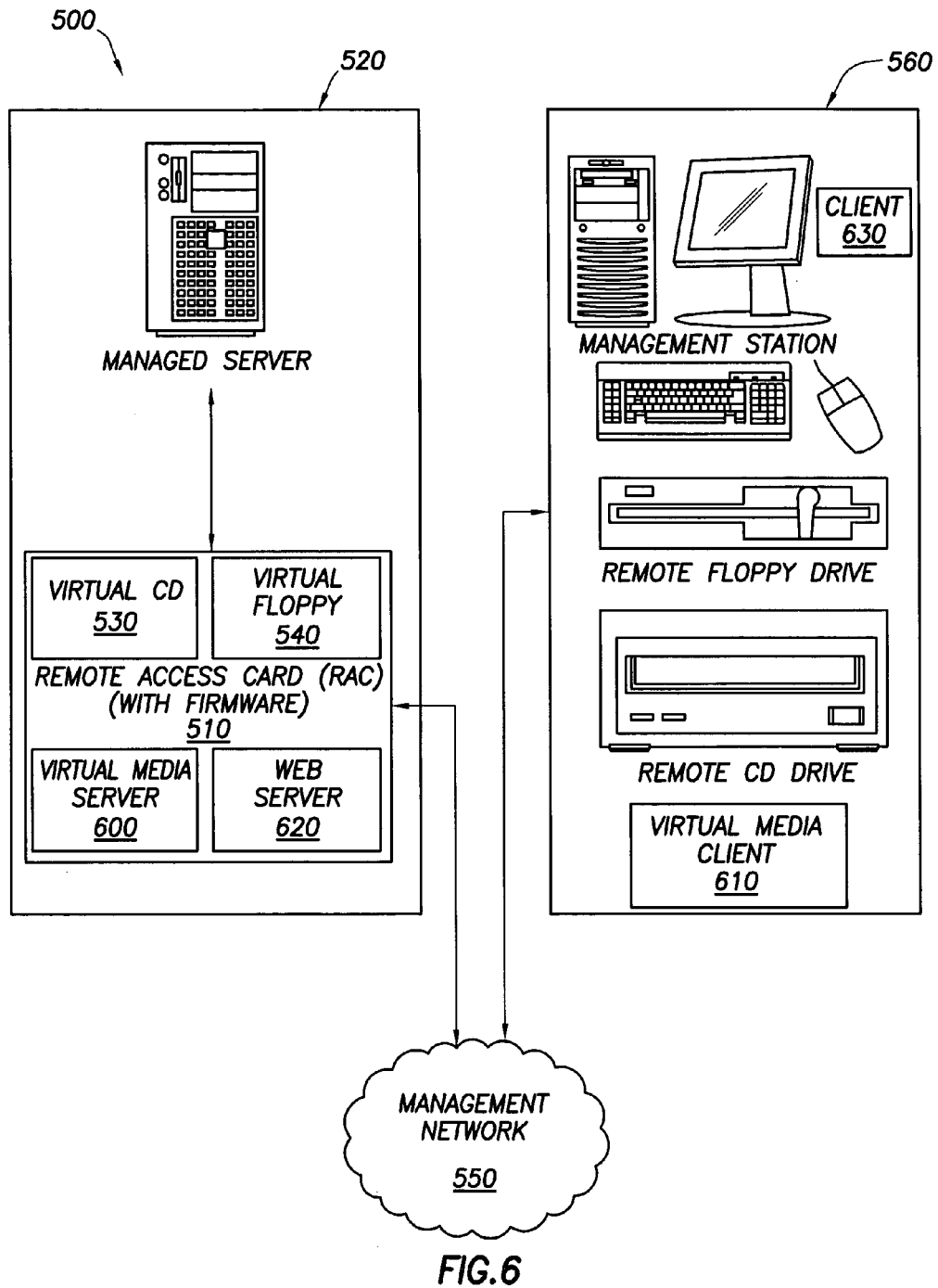
FIG. 6 schematically illustrates a virtual media server that may run in the firmware of the remote access card (RAC), as shown in FIG. 5, and a virtual media client in the plug-in that may run on the management station, according to teachings of the present disclosure.

The remote access card (RAC) 510, such as the Dell® Remote Access Controller 5 (DRAC5) 510, may use a client/server model to perform virtual media functions. As shown in FIG. 6, for example, a virtual media server 600 may run in the firmware of the remote access card (RAC) 510, such as the Dell® Remote Access Controller 5 (DRAC5) 510, and a virtual media client 610 in the plug-in may run on the management station 560. Once logged in to a Web server 620 of the remote access card (RAC) 510, such as the Dell® Remote Access Controller 5 (DRAC5) 510, by using a client 630 disposed in the management station 560, for example, administrators may open the Virtual Media page to launch a connection to the virtual media server 600. When a virtual media session is established, all virtual CD 530 and/or virtual floppy disk drive 540 access requests from the managed host server system 520 may be directed to the virtual media plug-in on the management station 560 through the management network 550. The plug-in processes the requests, accesses the local device that is used as the virtual CD media and/or the virtual floppy disk drive media, such as the remote physical CD drive 570 and/or the remote physical floppy disk drive 580, and sends a response back to the virtual media server 600. The virtual media server 600 then sends the response to the virtual CD 530 device and/or the virtual floppy disk drive 540 device embedded in the remote access card (RAC) 510, such as the Dell® Remote Access Controller 5 (DRAC5) 510.

If the virtual media is not connected by a remote administrator, then the firmware for the remote access card (RAC) 510, such as the Dell® Remote Access Controller 5 (DRAC5) 510, automatically responds to any media access command with a "media not present" error message to the virtual CD 530 device and/or the virtual floppy disk drive 540 device. In such a scenario, the virtual CD 530 device and/or the virtual floppy disk drive 540 device behaves substantially the same way as the remote physical CD drive 570 and/or the remote physical floppy disk drive 580 device does that also does not have any media present. The virtual media devices, such as the virtual CD 530 and/or the virtual floppy disk drive 540, are always present to the operating system (OS) and/or basic input/output system (BIOS) on the managed host server system 520, regardless of whether or not the virtual media is connected.

Consequently, because the virtual CD 530 device and/or the virtual floppy disk drive 540 device looks substantially exactly like the remote physical CD drive 570 and/or the remote physical floppy disk drive 580 device in either connected or unconnected mode, the operating system (OS) on the managed host server system 520 may use a standard native device driver to access the virtual CD 530 device and/or the virtual floppy disk drive 540 device. Before the operating system (OS) loads its device driver, a system basic input/output system (BIOS) embedded on the remote access card (RAC) 510, such as the Dell® Remote Access Controller 5 (DRAC5) 510, may take control of the virtual CD 530 device and/or the virtual floppy disk drive 540 device.

The system basic input/output system (BIOS) may detect the virtual CD 530 device and/or the virtual floppy disk drive 540 device during the power-on self-test (POST) and may report the virtual CD 530 device and/or the virtual floppy disk drive 540 device as one or more boot entry vector (BEV) devices. The managed host server system 520 basic input/output system (BIOS) may add these boot entry vector (BEV) devices in the boot order list of the managed host server system 520 basic input/output system (BIOS). Administrators may change the boot order list of the managed host server system 520 basic input/output system (BIOS) in the basic input/output system (BIOS) setup screen to boot from the virtual CD 530 device and/or the virtual floppy disk drive 540 device.

Administrators may also readily use the virtual media feature to install a new operating system (OS) and/or driver, and/or to diagnose a system in a pre-operating system (pre-OS) environment. When used with console redirection, for example, the virtual media feature may further enable administrators to achieve very good remote-access capability.

Figure 7:
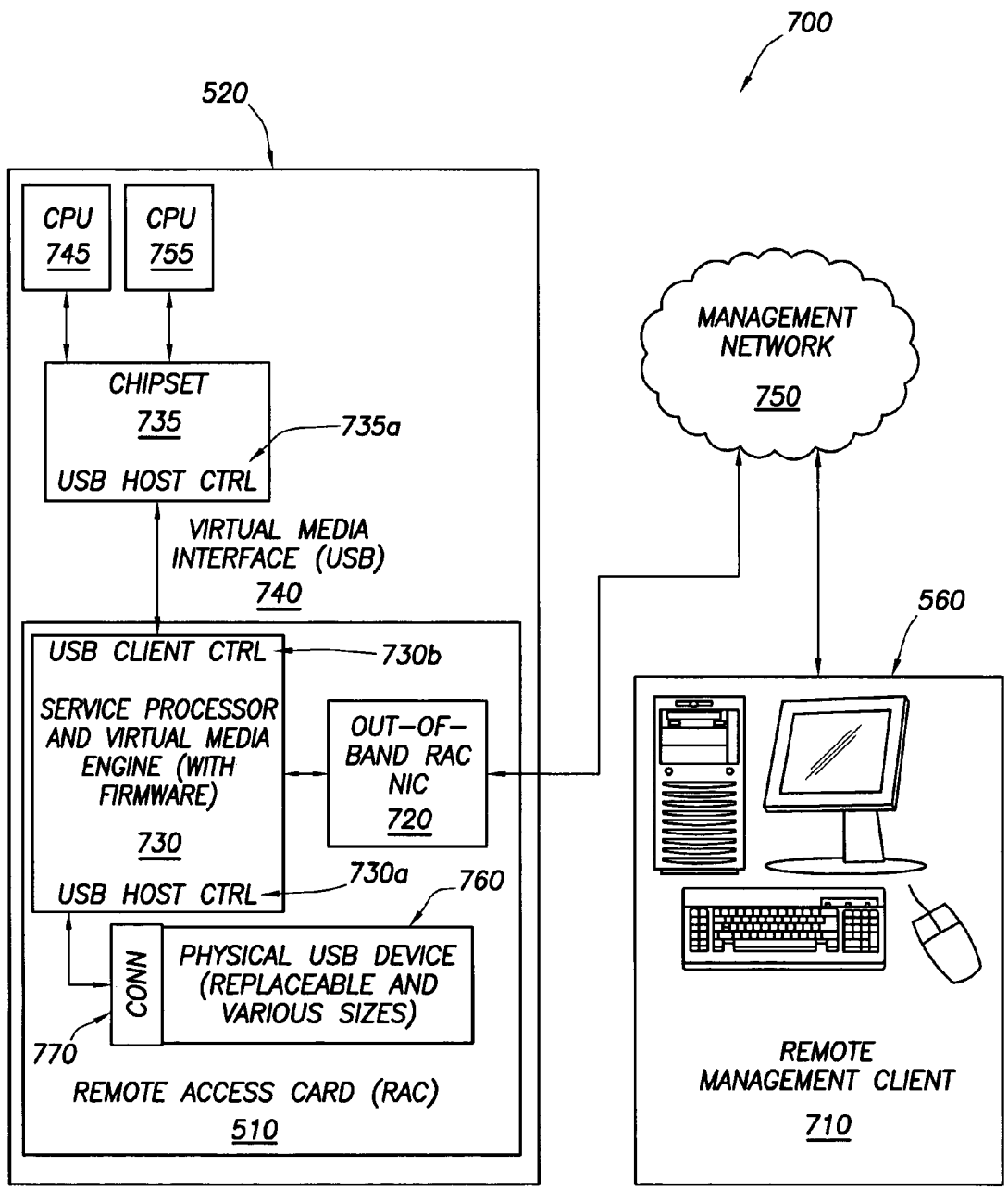
FIG. 7 schematically illustrates a diagram of a system with a scalable, replaceable, and/or upgradeable device via remote access solution virtual media useful in various exemplary embodiments, according to teachings of the present disclosure.

FIG. 7 schematically illustrates a diagram of a system 700 with a scalable, replaceable, and/or upgradeable device 760 via remote access solution virtual media useful in various exemplary embodiments, according to teachings of the present disclosure. In various illustrative embodiments, the system 700 may include the managed host server system 520 and a remote access solution comprising the remote access card (RAC) 510, such as the Dell® Remote Access Controller 5 (DRAC5) 510, disposed in the managed host server system 520. The remote access card (RAC) 510 may comprise a service processor and a virtual media engine 730. The system 700 may also include the physical plug-and-play universal serial bus (USB) device 760 disposed in the remote access card (RAC) 510. The service processor and the virtual media engine 730 may have firmware capable of emulating the physical plug-and-play universal serial bus (USB) device 760 to the managed host server system 520 as a virtual media device, proxying data communications between the physical plug-and-play universal serial bus (USB) device 760 and the managed host server system 520 through the service processor 730, and allowing remote access to the physical plug-and-play universal serial bus (USB) device 760 by a remote management client 710 through a management network 750 via at least one remote access card administrative command (RACADM) through an out-of-band dedicated remote access card (RAC) network interface card (NIC) 720 disposed in the remote access card (RAC) 510.

In various illustrative embodiments, in the system 700, the firmware of the service processor and the virtual media engine 730 may be capable of adding functionality to at least one of the managed host server system 520 and the remote management client 710 from within the managed host server system 520 by emulating at least one of a mass storage device, an out-of-band network interface card, at least one security feature, a webcam, a headphone, a microphone, a headphone/microphone combination, a universal serial bus (USB) host port expansion, and a radio frequency identification (RFID) reader to the managed host server system 520 as the virtual media device. In various illustrative embodiments, in the system 700, the firmware of the service processor and the virtual media engine 730 may be capable of proxying the data communications between a first universal serial bus (USB) host controller 730a disposed in the service processor 730 and the physical plug-and-play universal serial bus (USB) device 760 through a connector 770 disposed on the remote access card (RAC) 510 and proxying the data communications between a second universal serial bus (USB) host controller 735a disposed in a chipset 735 disposed in the managed host server system 520 and a universal serial bus (USB) client controller 730b disposed in the service processor 730 through a universal serial bus (USB) virtual media interface 740. The chipset 735 may be communicatively coupled with one or more central processing units (CPUs), such as central processing units (CPUs) 745 and 755 disposed in the managed host server system 520.

Figure 8:
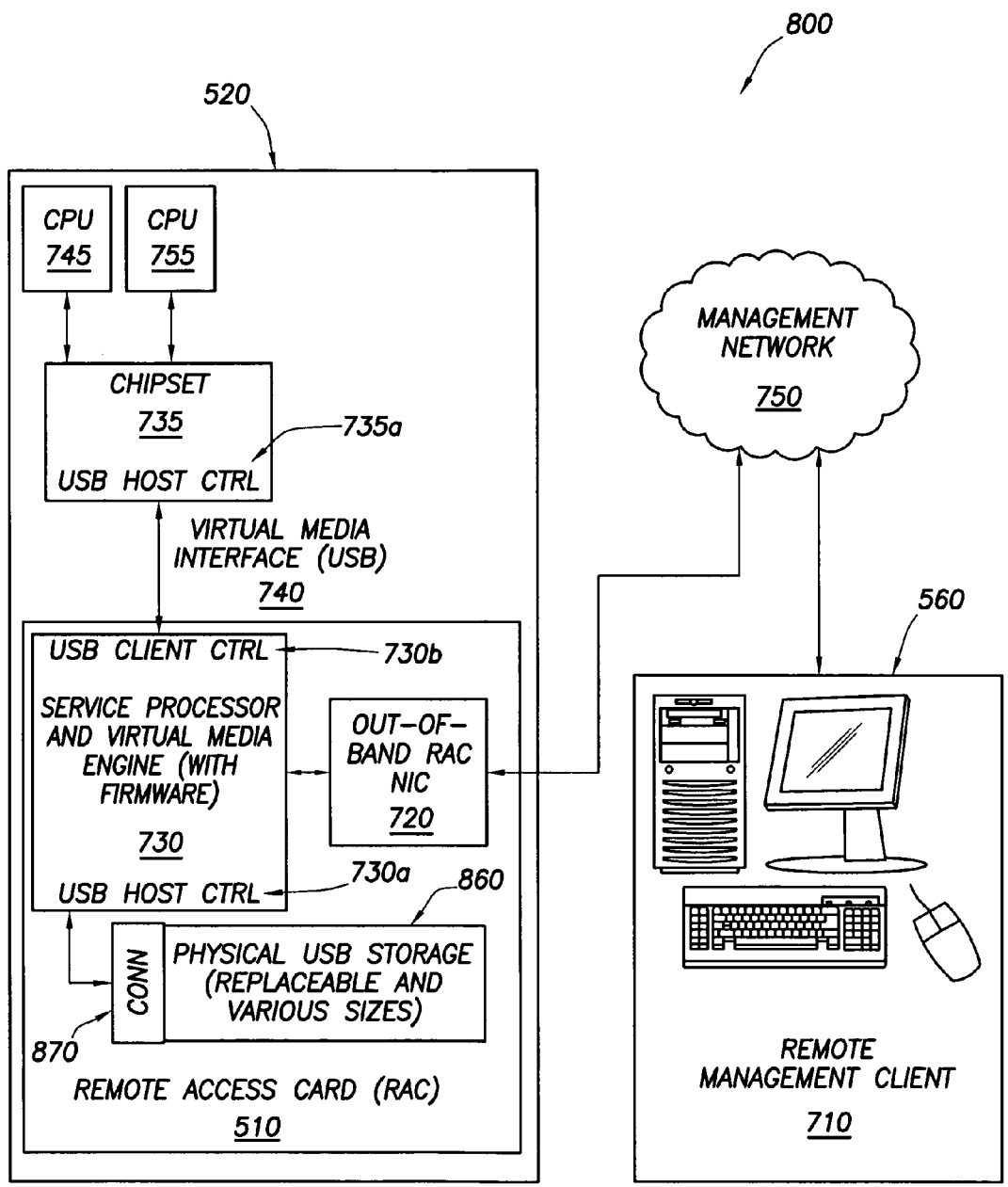
FIG. 8 schematically illustrates a diagram of a system with a scalable, replaceable, and/or upgradeable mass storage device via remote access solution virtual media useful in various exemplary embodiments, according to teachings of the present disclosure.

FIG. 8 schematically illustrates a diagram of a system 800 with a scalable, replaceable, and/or upgradeable mass storage device 860 via remote access solution virtual media useful in various exemplary embodiments, according to teachings of the present disclosure. In various illustrative embodiments, the system 800 may include the managed host server system 520 and a remote access solution comprising the remote access card (RAC) 510, such as the Dell® Remote Access Controller 5 (DRAC5) 510, disposed in the managed host server system 520. The remote access card (RAC) 510 may comprise the service processor and the virtual media engine 730. The system 800 may also include the physical plug-and-play universal serial bus (USB) mass storage device 860 disposed in the remote access card (RAC) 510. The service processor and the virtual media engine 730 may have firmware capable of emulating the physical plug-and-play universal serial bus (USB) mass storage device 860 to the managed host server system 520 as a persistent virtual mass storage device, proxying data communications between the physical plug-and-play universal serial bus (USB) mass storage device 860 and the managed host server system 520 through the service processor 730, and allowing remote access to the physical plug-and-play universal serial bus (USB) mass storage device 860 by the remote management client 710 via at least one remote access card administrative command (RACADM) through an out-of-band dedicated remote access card (RAC) network interface card (NIC) 720 disposed in the remote access card (RAC) 510.

In various illustrative embodiments, in the system 800, the service processor 730 may proxy virtual storage traffic between the universal serial bus (USB) host controller 730a disposed in the service processor 730 and the universal serial bus (USB) client controller 730b also disposed in the service processor 730 to emulate a real universal serial bus (USB) key, such as the physical plug-and-play universal serial bus (USB) mass storage device 860, as the persistent virtual mass storage device. The remote management client 710 may also access the persistent virtual storage via the out-of-band dedicated remote access card (RAC) network interface card (NIC) 720 disposed in the remote access card (RAC) 510.

In various illustrative embodiments, in the system 800, the firmware of the service processor and the virtual media engine 730 may be capable of adding functionality to at least one of the managed host server system 520 and the remote management client 710 from within the managed host server system 520 by further emulating at least one of another mass storage device, an out-of-band network interface card, at least one security feature, a webcam, a headphone, a microphone, a headphone/microphone combination, a universal serial bus (USB) host port expansion, and a radio frequency identification (RFID) reader to the managed host server system 520 as another virtual media device. In various illustrative embodiments, in the system 800, the firmware of the service processor and the virtual media engine 730 may be capable of proxying the data communications between the first universal serial bus (USB) host controller 730a disposed in the service processor 730 and the physical plug-and-play universal serial bus (USB) device 760 through the connector 770 disposed on the remote access card (RAC) 510 and proxying the data communications between the second universal serial bus (USB) host controller 735a disposed in the chipset 735 disposed in the managed host server system 520 and the universal serial bus (USB) client controller 730b disposed in the service processor 730 through the universal serial bus (USB) virtual media interface 740. The chipset 735 may be communicatively coupled with one or more central processing units (CPUs), such as the central processing units (CPUs) 745 and 755 disposed in the managed host server system 520.

Figure 9:
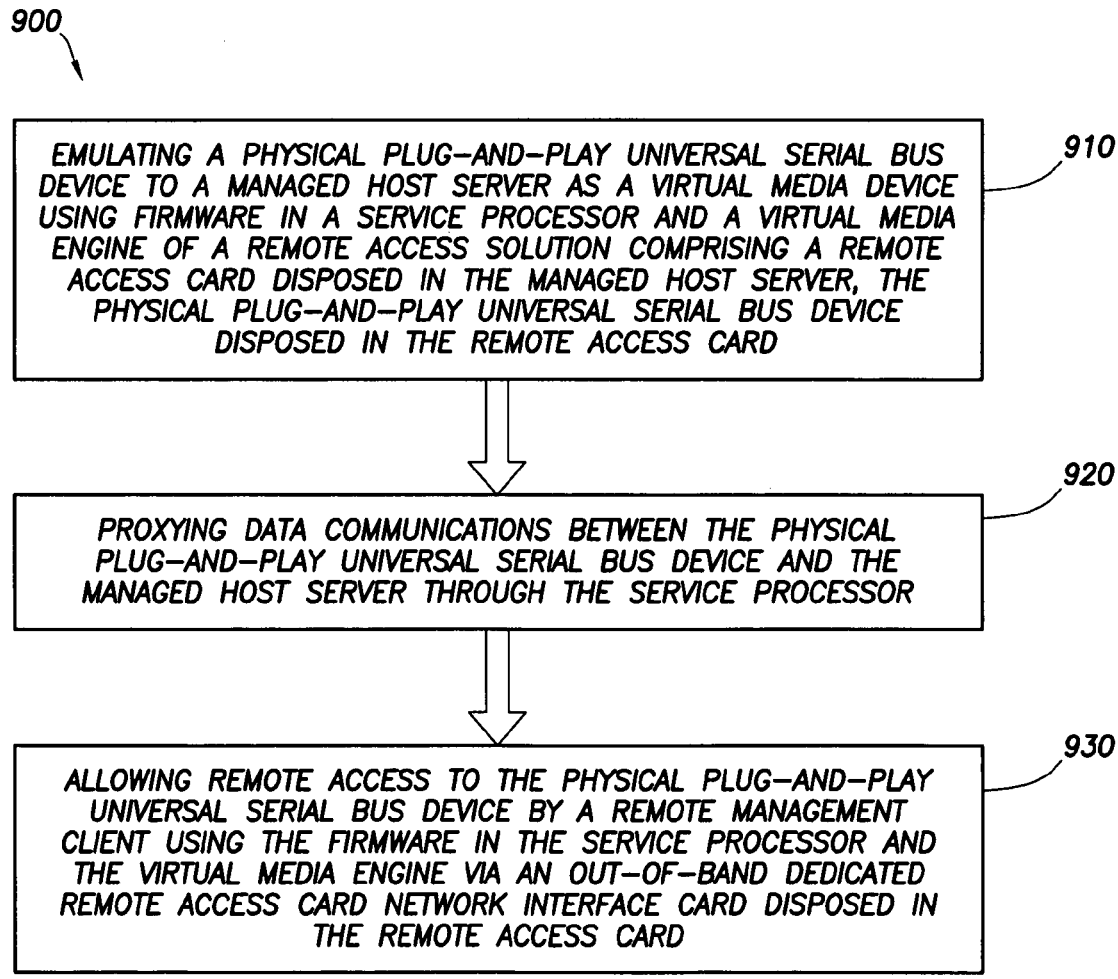
FIG. 9 schematically illustrates an exemplary method to provide at least one of a scalable, a replaceable, and an upgradeable device via remote access solution virtual media, according to teachings of the present disclosure.

FIG. 9 schematically illustrates an exemplary method to provide at least one of a scalable, a replaceable, and an upgradeable device via remote access solution virtual media, according to teachings of the present disclosure. In various illustrative embodiments, as shown in FIG. 9, a method 900 to provide at least one of a scalable, a replaceable, and an upgradeable device via remote access solution virtual media may be provided. The method 900 may comprise emulating a physical plug-and-play universal serial bus device to a managed host server system as a virtual media device using firmware in a service processor and a virtual media engine of a remote access solution comprising a remote access card disposed in the managed host server system, the physical plugand-play universal serial bus device disposed in the remote access card, as indicated at 910. The method 900 may also comprise proxying data communications between the physical plug-and-play universal serial bus device and the managed host server system through the service processor, as indicated at 920. The method 900 may also comprise allowing remote access to the physical plug-and-play universal serial bus device by a remote management client using the firmware in the service processor and the virtual media engine via an out-of-band dedicated remote access card network interface card disposed in the remote access card, as indicated at 930.

In various illustrative embodiments, for example, the method 900 may comprise emulating the physical plug-and-play universal serial bus (USB) device 760 to the managed host server system 520 as a virtual media device using the firmware in the service processor and the virtual media engine 730 of the remote access solution comprising the remote access card (RAC) 510 disposed in the managed host server system 520, the physical plug-and-play universal serial bus (USB) device 760 disposed in the remote access card (RAC) 510, as indicated at 910. In various illustrative embodiments, the physical plug-and-play universal serial bus (USB) device 760 emulated to the managed host server system 520 as the virtual media device by the firmware in the service processor and the virtual media engine 730 may further comprise at least one of a mass storage device, an out-of-band network interface card, at least one security feature, a webcam, a headphone, a microphone, a headphone/microphone combination, a universal serial bus (USB) host port expansion, and a radio frequency identification (RFID) reader.

In various illustrative embodiments, adding functionality to at least one of the managed host server system 520 and the remote management client 710 from within the managed host server system 520 may further comprise having the physical plug-and-play universal serial bus (USB) device 760, emulated to the managed host server system 520 as the virtual media device by the firmware in the service processor and the virtual media engine 730, further comprise at least one of the mass storage device, the out-of-band network interface card, the at least one security feature, the webcam, the headphone, the microphone, the headphone/microphone combination, the universal serial bus (USB) host port expansion, and the radio frequency identification (RFID) reader. In various illustrative embodiments, for example, the method 900 may comprise emulating the physical plug-and-play universal serial bus (USB) mass storage device 860 to the managed host server system 520 as a persistent virtual storage device using the firmware in the service processor and the virtual media engine 730 of the remote access solution comprising the remote access card (RAC) 510 disposed in the managed host server system 520, the physical plug-and-play universal serial bus (USB) device 760 disposed in the remote access card (RAC) 510, as indicated at 910. In various illustrative embodiments, adding functionality to at least one of the managed host server system 520 and the remote management client 710 from within the managed host server system 520 may further comprise having, in addition to the physical plug-and-play universal serial bus (USB) mass storage device 860, emulated to the managed host server system 520 as the persistent virtual storage device by the firmware in the service processor and the virtual media engine 730, another virtual media device emulated to the managed host server system 520, the other virtual media device comprising at least one of another mass storage device, the out-of-band network interface card, the at least one security feature, the webcam, the headphone, the microphone, the headphone/microphone combination, the universal serial bus (USB) host port expansion, and the radio frequency identification (RFID) reader.

In various illustrative embodiments, for example, the method 900 may also comprise proxying data communications between the physical plug-and-play universal serial bus (USB) device 760 and the managed host server system 520 through the service processor 730, as indicated at 920. In various illustrative embodiments, for example, the method 900 may also comprise proxying data communications between the physical plug-and-play universal serial bus (USB) mass storage device 860 and the managed host server system 520 through the service processor 730, as indicated at 920. In various illustrative embodiments, proxying data communications between the physical plug-and-play universal serial bus (USB) device 760 and/or the physical plug-and-play universal serial bus (USB) mass storage device 860 and the managed host server system 520 through the service processor 730 may further comprise proxying the data communications between the universal serial bus (USB) host controller 730*a* disposed in the service processor 730 and the physical plug-and-play universal serial bus (USB) device 760 and/or the physical plug-and-play universal serial bus (USB) mass storage device 860, respectively. In various illustrative embodiments, proxying data communications between the physical plug-and-play universal serial bus (USB) device 760 and/or the physical plug-and-play universal serial bus (USB) mass storage device 860 and the managed host server system 520 through the service processor 730 may further comprise proxying the data communications between the universal serial bus (USB) host controller 730*a* disposed in the service processor 730 and the physical plug-and-play universal serial bus (USB) device 760 through the connector 770 disposed on the remote access card 510 and/or the physical plug-and-play universal serial bus (USB) mass storage device 860 through the connector 870 disposed on the remote access card 510, respectively.

In various illustrative embodiments, proxying data communications between the physical plug-and-play universal serial bus (USB) device 760 and/or the physical plug-and-play universal serial bus (USB) mass storage device 860 and the managed host server system 520 through the service processor 730 may further comprise proxying the data communications between the universal serial bus (USB) host controller 735*a* disposed in the chipset 735 disposed in the managed host server system 520 and the universal serial bus (USB) client controller 730*b* disposed in the service processor 730. In various illustrative embodiments, proxying data communications between the physical plug-and-play universal serial bus (USB) device 760 and/or the physical plug-and-play universal serial bus (USB) mass storage device 860 and the managed host server system 520 through the service processor 730 may further comprise proxying the data communications between the universal serial bus (USB) host controller 735*a* disposed in the chipset 735 disposed in the managed host server system 520 and the universal serial bus (USB) client controller 730*b* disposed in the service processor 730 through the universal serial bus virtual media interface 740.

In various illustrative embodiments, proxying data communications between the physical plug-and-play universal serial bus (USB) device 760 and/or the physical plug-and-play universal serial bus (USB) mass storage device 860 and the managed host server system 520 through the service processor 730 may further comprise proxying the data communications between the first universal serial bus (USB) host controller 730*a* disposed in the service processor 730 and the physical plug-and-play universal serial bus (USB) device 760 and/or the physical plug-and-play universal serial bus (USB) mass storage device 860, respectively, and between the second universal serial bus (USB) host controller 735*a* disposed in the chipset 735 disposed in the managed host server system 520 and the universal serial bus (USB) client controller 730*b* disposed in the service processor 730. In various illustrative embodiments, proxying data communications between the physical plug-and-play universal serial bus (USB) device 760 and/or the physical plug-and-play universal serial bus (USB) mass storage device 860 and the managed host server system 520 through the service processor 730 may further comprise proxying the data communications between the first universal serial bus (USB) host controller 730*a* disposed in the service processor 730 and the physical plug-and-play universal serial bus (USB) device 760 through the connector 770 disposed on the remote access card 510 and/or the physical plug-and-play universal serial bus (USB) mass storage device 860 through the connector 870 disposed on the remote access card 510, respectively, and between the second universal serial bus (USB) host controller 735*a* disposed in the chipset 735 disposed in the managed host server system 520 and the universal serial bus (USB) client controller 730*b* disposed in the service processor 730.

In various illustrative embodiments, proxying data communications between the physical plug-and-play universal serial bus (USB) device 760 and/or the physical plug-and-play universal serial bus (USB) mass storage device 860 and the managed host server system 520 through the service processor 730 may further comprise proxying the data communications between the first universal serial bus (USB) host controller 730*a* disposed in the service processor 730 and the physical plug-and-play universal serial bus (USB) device 760 and/or the physical plug-and-play universal serial bus (USB) mass storage device 860, respectively, and between the second universal serial bus (USB) host controller 735*a* disposed in the chipset 735 disposed in the managed host server system 520 and the universal serial bus (USB) client controller 730*b* disposed in the service processor 730 through the universal serial bus virtual media interface 740. In various illustrative embodiments, proxying data communications between the physical plug-and-play universal serial bus (USB) device 760 and/or the physical plug-and-play universal serial bus (USB) mass storage device 860 and the managed host server system 520 through the service processor 730 may further comprise proxying the data communications between the first universal serial bus (USB) host controller 730*a* disposed in the service processor 730 and the physical plug-and-play universal serial bus (USB) device 760 through the connector 770 disposed on the remote access card 510 and/or the physical plug-and-play universal serial bus (USB) mass storage device 860 through the connector 870 disposed on the remote access card 510, respectively, and between the second universal serial bus (USB) host controller 735*a* disposed in the chipset 735 disposed in the managed host server system 520 and the universal serial bus (USB) client controller 730*b* disposed in the service processor 730 through the universal serial bus virtual media interface 740.

In various illustrative embodiments, for example, the method 900 may also comprise allowing remote access to the physical plug-and-play universal serial bus (USB) device 760 by the remote management client 710 using the firmware in the service processor and the virtual media engine 730 via the out-of-band dedicated remote access card (RAC) network interface card (NIC) 720 disposed in the remote access card (RAC) 510, as indicated at 930. In various illustrative embodiments, for example, the method 900 may also comprise allowing remote access to the physical plug-and-play universal serial bus (USB) mass storage device 860 by the remote management client 710 using the firmware in the service processor and the virtual media engine 730 via the out-of-band dedicated remote access card (RAC) network interface card (NIC) 720 disposed in the remote access card (RAC) 510, as indicated at 930. In various illustrative embodiments, allowing remote access to the physical plug-and-play universal serial bus (USB) device 760 and/or the physical plug-and-play universal serial bus (USB) mass storage device 860 may further comprise allowing remote access to the physical plug-and-play universal serial bus (USB) device 760 and/or the physical plug-and-play universal serial bus (USB) mass storage device 860, respectively, by the remote management client 710 through the management network 750 via the at least one remote access card administrative command (RACADM) through the out-of-band dedicated remote access card (RAC) network interface card (NIC) 720 disposed in the remote access card (RAC) 510.

Most system-on-a-chip integrated circuits (ICs) contain both a universal serial bus (USB) client and a universal serial bus (USB) host, and many large-capacity universal serial bus (USB) keys having up to about 4 gigabytes (GBs) or so fit in very small form factors. In various illustrative embodiments, as described above with respect to FIG. 8, an embedded operating system (OS) driver may read and/or write to a real, replaceable universal serial bus (USB) key, such as the physical plug-and-play universal serial bus (USB) mass storage device 860, as described above, that may be disposed or mounted mezzanine-style to the remote access card (RAC) 510, such as the Dell® Remote Access Controller 5 (DRAC5) 510, or remote access system. The embedded operating system (OS) driver, embedded in the firmware of the service processor 730, for example, may proxy the data communications through the universal serial bus (USB) client controller 730*b* as the embedded operating system (OS) driver emulates the real, replaceable universal serial bus (USB) key, such as the physical plug-and-play universal serial bus (USB) mass storage device 860, to the universal serial bus (USB) host controller 735*a* disposed in the chipset 735 disposed in the managed host server system 520. The managed host server system 520 sees a universal serial bus (USB) mass storage device, but is actually communicating through the universal serial bus (USB) client controller 730*b* of the service processor 730 of the remote access card (RAC) 510 to the real universal serial bus (USB) key, such as the physical plug-and-play universal serial bus (USB) mass storage device 860, on the downstream host side. From the platform, the virtual universal serial bus (USB) mass storage device looks like a local universal serial bus (USB) key, but the firmware of the service processor 730 of the remote access card (RAC) 510 may detach the virtual universal serial bus (USB) mass storage device from the managed host server system 520 and may allow remote access to this same flash space, the real universal serial bus (USB) key, such as the physical plug-and-play universal serial bus (USB) mass storage device 860.

In addition, in various illustrative embodiments, as described above with respect to FIG. 7, once this infrastructure is in place, the value of this feature of providing a scalable, replaceable, and/or upgradeable device via remote access solution virtual media is great due to any number of applications that may be extended via the service processor 730 proxy of anything plugged into the universal serial bus (USB) host controller 730*a* of the service processor 730 of the remote access card (RAC) 510 to emulate and/or add additional functionality to the managed host server system 520 and/or the remote management client 710 from within the managed host server system 520. Examples may include another mass storage device, an out-of-band network interface card, at least one security feature, a webcam, a headphone, a microphone, a headphone/microphone combination, a universal serial bus (USB) host port expansion, a radio frequency identification (RFID) reader, and the like.

In various illustrative embodiments, a server management controller, such as the service processor and virtual media engine 730 of the remote access card (RAC) 510 disposed on the managed host server system 520, may act as an intermediary between the managed host server system 520 and a physical plug-and-play device attached to the managed host server system 520. The physical plug-and-play device attached to the managed host server system 520 may then be either emulated to the managed host server system 520 or made accessible to a remote administrator, such as the remote management client 710, for purposes such as providing scalable, replaceable, and/or upgradeable persistent virtual storage, and the like.

The method and system disclosed herein are advantageous in providing a scalable, replaceable, and/or upgradeable device via remote access solution virtual media such that moderate to heavy usage of this virtual media device feature may not wear out the flash ROM of the remote access card (RAC) before the useful life of the remote access card (RAC) and/or resident server. In addition, the method and system disclosed herein are advantageous in providing a scalable, replaceable, and/or upgradeable device via remote access solution virtual media such that a virus and/or a runaway process may not quickly wear out the flash ROM of the remote access card (RAC) via excessive writes.

Moreover, the method and system disclosed herein are advantageous in providing a scalable, replaceable, and/or upgradeable device via remote access solution virtual media such that users and/or customers may be accommodated who may have very different usages for this virtual media device feature that may require a very large amount of memory, such as an entire operating system (OS), a full boot image, system diagnostics, backup firmware, basic input/output system (BIOS) images, and the like. Whereas conventional remote access card (RAC)s may only afford about 8 megabytes (MB) of storage in the main flash ROM of the remote access card (RAC), which may not be enough for the wide variety of applications, the persistent virtual mass storage device according to the present disclosure is fully scalable and, consequently, not limited in size, quite unlike the conventional remote access cards. Moreover, the useful life of a remote access card (RAC) may be 8 years or so, and the method and system disclosed herein are advantageous in providing a scalable, replaceable, and/or upgradeable device via remote access solution virtual media such that the persistent virtual mass storage device may be allowed to be scaled without burdening the base system cost and may not result in the remote access card (RAC) failing prematurely, because the flash ROM of the remote access card (RAC) may be substantially protected from wearing out.

As described above, the method and system disclosed herein are advantageous in providing a scalable, replaceable, and/or upgradeable device via remote access solution virtual media without substantially burdening the base system cost. In various particular illustrative embodiments, as described above, the method and system disclosed herein are advantageous in providing a scalable, replaceable, and/or upgradeable persistent virtual mass storage device via remote access solution virtual media without substantially burdening the base system cost. As described above, users and/or customers may choose the size or scale of this persistent virtual mass storage device and/or replace this persistent virtual mass storage device if this persistent virtual mass storage device ever wears out and/or upgrade this persistent virtual mass storage device without needing to replace the entire remote access solution.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

Although various illustrative embodiments of the present invention and their advantages are described in detail, a person skilled in the art having the benefit of the present disclosure could make various alterations, additions, and/or omissions without departing from the spirit and scope of the present invention, as defined by the appended claims.

What is claimed is:

1. A method to provide at least one of a scalable, a replaceable, and an upgradeable device via remote access solution virtual media, the method comprising:

emulating a physical plug-and-play universal serial bus (USB) device to a managed host server system as a virtual media device using firmware in a service processor and a virtual media engine of a remote access solution comprising a remote access card disposed in the managed host server system, the physical plug-and-play USB device disposed in the remote access card, and wherein the remote access card is powered by auxiliary power;

detecting by a basic input/output system (BIOS) the virtual media device;

loading a device driver associated with the virtual media device;

proxying data communications between the physical plug-and-play universal serial bus device and the managed host server system through the service processor, wherein the service processor includes a USB client controller directly coupled to the managed host server system;

proxying virtual storage traffic between the USB client controller and a USB host controller through the service processor, wherein the USB client controller and the USB host controller are disposed in the service processor to emulate a USB key;

proxying data communications between a second USB host controller and the USB client controller through a USB virtual media interface, wherein the second USB host controller is disposed in the managed host server but disposed outside of the remote access card;

allowing remote access to the physical plug-and-play USB device by a remote management client using the firmware in the service processor and the virtual media engine; and providing a data pathway between an out-of-band dedicated network interface card disposed in the remote access card and the physical plug-and-play USB device through a USB host controller disposed in the service processor.

2. The method of claim 1, wherein emulating the physical plug-and-play universal serial bus device to the managed host server system as the virtual media device further comprises emulating at least one of a mass storage device, an out-of-band network interface card, at least one security feature, a webcam, a headphone, a microphone, a headphone/microphone combination, a universal serial bus host port expansion, and a radio frequency identification reader to the managed host server system as the virtual media device.

3. The method of claim 1, wherein emulating the physical plug-and-play universal serial bus device to the managed host server system as the virtual media device further comprises adding functionality to at least one of the managed host server system and the remote management client from within the managed host server system by emulating at least one of a mass storage device, an out-of-band network interface card, at least one security feature, a webcam, a headphone, a microphone, a headphone/microphone combination, a universal serial bus host port expansion, and a radio frequency identification reader to the managed host server system as the virtual media device.

4. The method of claim 1, wherein proxying the data communications between the physical plug-and-play universal serial bus device and the managed host server system through the service processor further comprises proxying the data communications between a universal serial bus host controller disposed in the service processor and the physical plug-and-play universal serial bus device.

5. The method of claim 1, wherein proxying the data communications between the physical plug-and-play universal serial bus device and the managed host server system through the service processor further comprises proxying the data communications between a universal serial bus host controller disposed in the service processor and the physical plug-and-play universal serial bus device through a connector disposed on the remote access card.

6. The method of claim 1, wherein proxying the data communications between the physical plug-and-play universal serial bus device and the managed host server system through the service processor further comprises proxying the data communications between a universal serial bus host controller disposed in a chipset disposed in the managed host server system and a universal serial bus client controller disposed in the service processor.

7. The method of claim 1, wherein proxying the data communications between the physical plug-and-play universal serial bus device and the managed host server system through the service processor further comprises proxying the data communications between a universal serial bus host controller disposed in a chipset disposed in the managed host server system and a universal serial bus client controller disposed in the service processor through a universal serial bus virtual media interface.

8. The method of claim 1, wherein proxying the data communications between the physical plug-and-play universal serial bus device and the managed host server system through the service processor further comprises proxying the data communications between a first universal serial bus host controller disposed in the service processor and the physical plug-and-play universal serial bus device and between a second universal serial bus host controller disposed in a chipset disposed in the managed host server system and a universal serial bus client controller disposed in the service processor.

9. The method of claim 1, wherein proxying the data communications between the physical plug-and-play universal serial bus device and the managed host server system through the service processor further comprises proxying the data communications between a first universal serial bus host controller disposed in the service processor and the physical plug-and-play universal serial bus device through a connector disposed on the remote access card and proxying the data communications between a second universal serial bus host controller disposed in a chipset disposed in the managed host server system and a universal serial bus client controller disposed in the service processor.

10. The method of claim 1, wherein proxying the data communications between the physical plug-and-play universal serial bus device and the managed host server system through the service processor further comprises proxying the data communications between a first universal serial bus host controller disposed in the service processor and the physical plug-and-play universal serial bus device and between a second universal serial bus host controller disposed in a chipset disposed in the managed host server system and a universal serial bus client controller disposed in the service processor through a universal serial bus virtual media interface.

11. The method of claim 1, wherein proxying the data communications between the physical plug-and-play universal serial bus device and the managed host server system through the service processor further comprises proxying the data communications between a first universal serial bus host controller disposed in the service processor and the physical plug-and-play universal serial bus device through a connector disposed on the remote access card and proxying the data communications between a second universal serial bus host controller disposed in a chipset disposed in the managed host server system and a universal serial bus client controller disposed in the service processor through a universal serial bus virtual media interface.

12. The method of claim 1, wherein allowing remote access to the physical plug-and-play universal serial bus device by the remote management client using the firmware in the service processor and the virtual media engine via the out-of-band dedicated remote access card network interface card further comprises allowing remote access to the physical plug-and-play universal serial bus device by the remote management client using the firmware in the service processor and the virtual media engine via at least one remote access card administrative command through the out-of-band dedicated remote access card network interface card.

13. A method to provide at least one of a scalable, a replaceable, and an upgradeable mass storage device via remote access solution virtual media, the method comprising:
    emulating a physical plug-and-play universal serial bus (USB) mass storage device to a managed host server system as a persistent virtual mass storage device using firmware in a service processor and a virtual media engine of a remote access solution comprising a remote access card disposed in the managed host server system, the physical plug-and-play USB mass storage device disposed in the remote access card, and wherein the remote access card is powered by auxiliary power;
    detecting by a basic input/output system (BIOS) the virtual media device; loading a device driver associated with the virtual media device;
    proxying data communications between the physical plug-and-play USB mass storage device and the managed host server system through the service processor, wherein the service processor includes a USB client controller directly coupled to the managed host server system;

proxying virtual storage traffic between the USB client controller and a USB host controller through the service processor, wherein the USB client controller and the USB host controller are disposed in the service processor to emulate a USB key;

proxying data communications between a second USB host controller and the USB client controller through a USB virtual media interface, wherein the second USB host controller is disposed in the managed host server but disposed outside of the remote access card;

allowing remote access to the physical plug-and-play USB mass storage device by a remote management client using the firmware in the service processor and the virtual media engine; and providing a data pathway between an out-of-band dedicated network interface card disposed in the remote access card and the physical plug-and-play USB device through a USB host controller disposed in the service processor.

14. The method of claim 13, wherein emulating the physical plug-and-play universal serial bus mass storage device to the managed host server system as the persistent virtual mass storage device further comprises adding functionality to at least one of the managed host server system and the remote management client from within the managed host server system by emulating at least one of another mass storage device, an out-of-band network interface card, at least one security feature, a webcam, a headphone, a microphone, a headphone/microphone combination, a universal serial bus host port expansion, and a radio frequency identification reader to the managed host server system as another virtual media device.

15. The method of claim 13, wherein proxying the data communications between the physical plug-and-play universal serial bus mass storage device and the managed host server system through the service processor further comprises proxying the data communications between a first universal serial bus host controller disposed in the service processor and the physical plug-and-play universal serial bus mass storage device and between a second universal serial bus host controller disposed in a chipset disposed in the managed host server system and a universal serial bus client controller disposed in the service processor.

16. The method of claim 13, wherein proxying the data communications between the physical plug-and-play universal serial bus mass storage device and the managed host server system through the service processor further comprises proxying the data communications between a first universal serial bus host controller disposed in the service processor and the physical plug-and-play universal serial bus mass storage device through a connector disposed on the remote access card and proxying the data communications between a second universal serial bus host controller disposed in a chipset disposed in the managed host server system and a universal serial bus client controller disposed in the service processor through a universal serial bus virtual media interface.

17. The method of claim 13, wherein allowing remote access to the physical plug-and-play universal serial bus mass storage device by the remote management client using the firmware in the service processor and the virtual media engine via the out-of-band dedicated remote access card network interface card further comprises allowing remote access to the physical plug-and-play universal serial bus mass storage device by the remote management client using the firmware in the service processor and the virtual media engine via at least one remote access card administrative command through the out-of-band dedicated remote access card network interface card.

18. A system for providing at least one of a scalable, a replaceable, and an upgradeable device via remote access solution virtual media, the system comprising:

a managed host server system;

a remote access solution comprising a remote access card disposed in the managed host server system, the remote access card comprising a service processor and a virtual media engine, wherein the service processor includes a universal serial bus (USB) client controller directly coupled to the managed host server system;

a physical plug-and-play universal serial bus device disposed in the remote access card;

a device driver associated with a virtual media device, wherein the device driver is loaded by a basic input/output system (BIOS) and wherein the BIOS detects the virtual media device; and wherein the service processor and the virtual media engine have firmware capable of emulating the physical plug-and-play USB device to the managed host server system as the virtual media device, proxying data communications between the physical plug-and-play USB device and the managed host server system through the service processor, allowing remote access to the physical plug-and-play USB device by a remote management client via at least one remote access card administrative command through an out-of-band dedicated network interface card disposed in the remote access card, providing a data pathway between the out-of-band dedicated network interface card disposed in the remote access card and the physical plug-and-play USB device through a USB host controller disposed in the service processor, and the remote access card is powered by auxiliary power, wherein the service processor proxies virtual storage traffic between the USB client controller and a USB host controller through the service processor, wherein the USB client controller and the USB host controller are disposed in the service processor to emulate a USB key; and wherein the service processor proxies data communications between a second USB host controller and the USB client controller through a USB virtual media interface, wherein the second USB host controller is disposed in the managed host server but disposed outside of the remote access card.

19. The method of claim 18, wherein the firmware of the service processor and the virtual media engine is capable of adding functionality to at least one of the managed host server system and the remote management client from within the managed host server system by emulating at least one of a mass storage device, an out-of-band network interface card, at least one security feature, a webcam, a headphone, a microphone, a headphone/microphone combination, a universal serial bus host port expansion, and a radio frequency identification reader to the managed host server system as the virtual media device.

20. The system of claim 18, wherein the firmware of the service processor and the virtual media engine is capable of proxying the data communications between a first universal serial bus host controller disposed in the service processor and the physical plug-and-play universal serial bus device through a connector disposed on the remote access card and proxying the data communications between a second universal serial bus host controller disposed in a chipset disposed in the managed host server system and a universal serial bus client controller disposed in the service processor through a universal serial bus virtual media interface.

* * * * *